Patented Oct. 23, 1928.

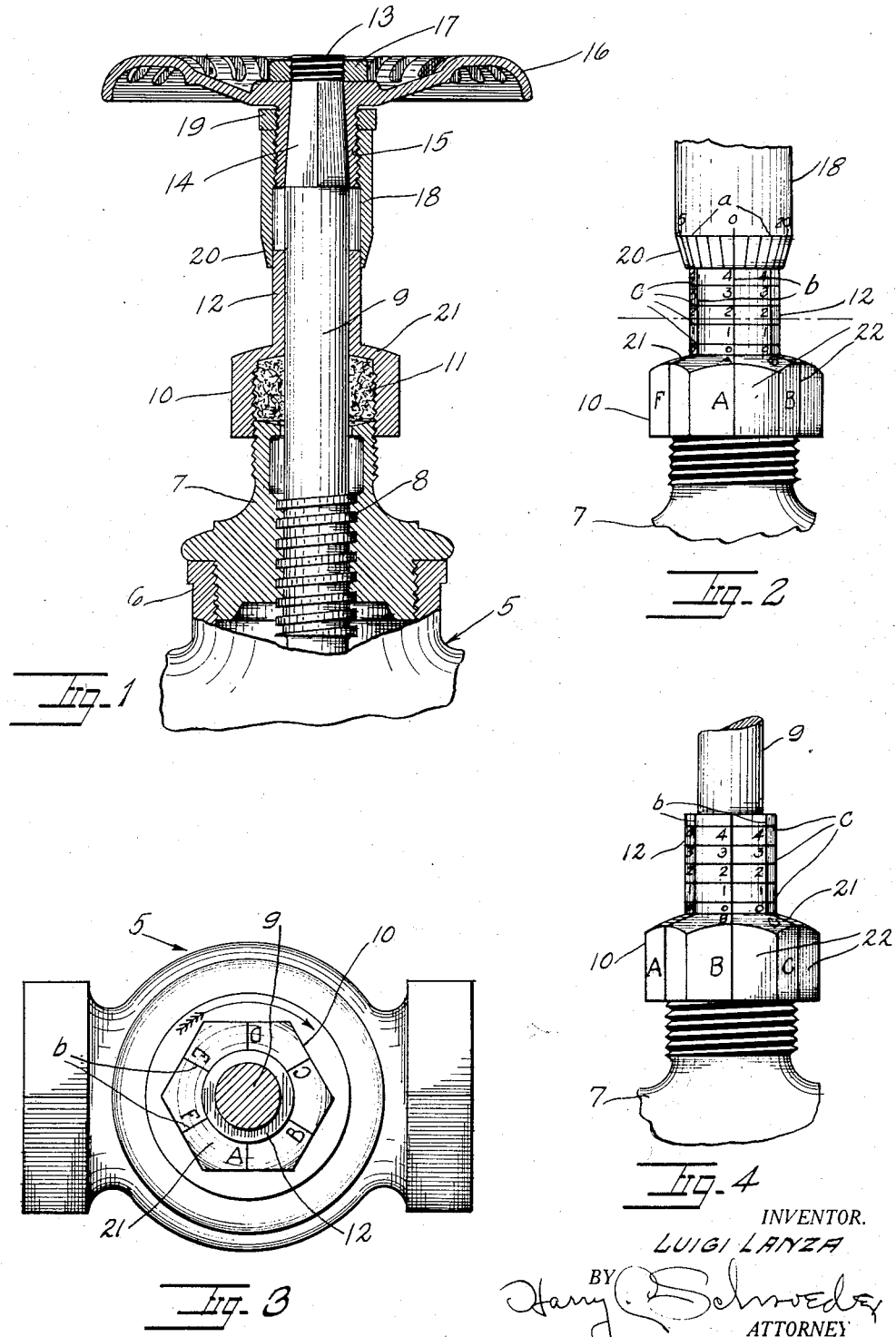

1,688,390

UNITED STATES PATENT OFFICE.

LUIGI LANZA, OF OAKLAND, CALIFORNIA.

GRADUATED VALVE.

Application filed July 5, 1927. Serial No. 203,321.

My invention relates to valves, and it refers particularly to valves which are provided with graduations for the purpose of informing persons whether the valves are closed or to what extent the valves are opened.

Although in the previous art attempts have been made to graduate valves for the aforementioned purpose, such attempts have not been successful, because, as the packing for the stem of the valve member in a valve of this character becomes worn and requires renewal or a retightening of the gland thereon, or as by the repeated turning off and on of the valve member, the latter, as well as the seat therefor, becomes worn, the mark, which indicates the closed position of the valve member, and the marks, which indicate the successive open positions of the valve member, change their respective positions, and because no means has been provided for making it possible to quickly cause the indicating marks to agree with such positional changes.

The main object of my invention is to provide, in a valve and on the stem of the valve member thereof, an adjustable element having indicating marks successively arranged thereon for accurately indicating successive positions of the valve stem relative to the gland, so that the element may be quickly adjusted to a correct position upon the valve stem and backed thereon in order to indicate when the valve is in its closed position or to indicate accurately the quantity of fluid flowing at a certain pressure through the valve.

Another object of my invention is to provide the gland in a valve of this character with a plurality of indicating marks adapted to register with the indicating marks on the adjustable element upon the valve stem, so that, if the valve is installed in a fluid conduit in such a manner that a view of the marks on the element is obtainable, an accurate reading of the closed or open positions of the valve may be easily effected by causing the zero-indicating mark on the element to register with the most available mark on the gland when the valve is closed.

With the foregoing and further objects in view, my invention resides in the combination and the arrangement of parts and in the details of construction hereinafter described and claimed, it being understood that changes in the precise embodiment of the invention hereinafter disclosed may be made within the scope of the appended claims without departing from the spirit of the invention.

In the drawings:

Figure 1 is an elevation, taken mid-sectionally of a portion of a valve body and showing in connection therewith the working parts which are included in the preferred embodiment of my invention;

Figure 2 is a broken side elevation showing a threaded portion of a valve body, the gland connected therewith, and also the element, which is adapted to be adjustably connected with the valve stem, as surrounding the tubular member of the gland and being turned to a position which indicates that the valve is fully opened, the gland being adjusted on the valve body to a position in which the longitudinal mark designated by the letter "A" is most available for enabling a person to read the positions of the valve member in the valve;

Figure 3 is a plan of a valve having a gland thereon in the position shown in Figure 2, the stem of the valve member being in section and without the indicating element thereon in order to show the gland clearly; and Figure 4 is a side elevation, similar to Figure 2, but with the indicating element removed from the valve stem and showing the gland turned to a position in which the longitudinal mark designated by the letter "B" is most available for enabling a person to read the positions of the valve member in the valve.

My invention is shown in the drawings as applied to a valve 5, which may be of the type having an internally threaded extension 6 at one side of the valve body for receiving therein the threaded end of the valve-stem guide 7, the latter in its turn being internally threaded for engagement with the threaded portion 8 of the valve stem 9. Since the interior construction of valves is well known and is not a part of my invention, an illustration thereof, including the valve seat and the part of the valve member adapted to be in engagement therewith, is omitted as superfluous.

The valve-stem guide 7 is externally threaded in the usual manner for receiving thereon a gland 10, which is adapted to compress a packing 11 placed at the end of the guide and around the stem 9. In this instance, the gland is concentrically provided with a tubular member 12, within which, when the gland is secured to the valve body, the valve stem may be freely rotated, the stem being threaded at its outer end 13 and also preferably provided adjacent to the threaded end with a slightly tapering, square portion 14, which fits the interior of the hub portion 15 of a hand wheel 16, so that the hand wheel may be placed upon the square portion 14 and may be secured to the stem by a nut 17 in engagement with the threaded end 13.

A barrel or tubular element 18, the inside diameter of which is such as to allow the barrel to be rotated freely on the gland extension 12, is at one end threaded internally, the hub portion 15 being correspondingly threaded externally for receiving the barrel thereon, and a nut 19 being screwed upon the hub portion and adapted to press against the end of the barrel so as to lock the barrel to the valve stem in any desired circumferential position relative thereto. At its opposite end, the barrel is preferably tapering to a comparatively thin edge, as shown at 20, and this tapering portion of the barrel is provided with a number of equidistantly spaced indicating marks $a$, which are arranged longitudinally of the barrel and extend to the thin edge of the tapering portion, as shown in Figure 2. The number of indicating marks $a$ is in this figure suggested as being twenty-five, every fifth mark being designated by a numeral, and only the numerals 5, 20, and a cipher being shown, and the numerals being arranged in a counterclockwise order on the barrel, as the latter is viewed from its end at the tapering portion.

Upon the tubular gland-member 12 are preferably arranged longitudinally and equidistantly a number of indicating marks $b$, which are also preferably extended over the juncture portion 21 of the member 12 with the gland and over the side faces 22 of the latter, so that each mark in its entirety is in one plane. These marks, for the purpose of illustration, are here shown as being six in number but their number may be smaller or greater, according to individual preferences or requirements. The marks may be distinguished from one another by designating characters, and these characters are preferably arranged both on the gland portion 21 and on the respective side faces 22 of the gland, the characters in this instance being shown as the capital letters A, B, C, D, E and F, and the arrangement of these letters being in a consecutive or alphabetical order in a reverse direction to that indicated by the curved arrow in Figure 3. In addition to the marks $b$, the gland member 12 has also thereon annular indicating marks $c$, which are preferably equidistantly spaced from one another in correspondence with the spacing of the threads in the threaded portion 8 of the valve stem 9, the number of the marks $c$ being shown as five, and, in order to distinguish the marks $c$ clearly from one another, designating numerals are placed at the respective marks, preferably at the intersection of the marks $c$ with the longitudinal marks $b$, these numerals beginning with ciphers at the mark $c$ nearest to the gland portion 21, and the numerals 1, 2, 3 and 4 being consecutively arranged at the respective successive marks $c$.

With the understanding that the threads shown in the figures are right-hand threads, it is evident from the foregoing that, when the gland 10 is tightened upon the packing 11 so that, for example, the indicating mark $b$ designated by the letter "A" is most available for observation, as shown in Figures 2 and 3, the barrel or tubular element 18 may be adjusted upon the hub portion 15 of the hand wheel 16 and locked in position so that the mark $a$, designated on the element by the cipher, registers with the mark A on the gland 10 and the gland member 12 in order to indicate the closed position of the valve member in the valve 5. If the hand wheel is then turned in the direction opposite to that indicated by the curved arrow in Figure 3, the valve member is opened to an extent indicated by the relation of the marks $a$ to the marks $c$ and the mark $b$ that is designated by the letter A. It, of course, should be understood that, if the valve 5 is assumed to be fully opened when the parts are in the position shown in Figure 2, the reading disclosed by a further turning of the hand wheel in the direction opposite to that indicated by the curved arrow must be ignored, since a greater quantity of fluid can not flow through the valve when the valve stem is turned beyond the indicated position than when the valve stem is turned exactly to it.

Again, when the valve stem is turned in the direction indicated by the curved arrow in Figure 3 from its fully opened position to a position between that and its aforementioned closed position, the degree of valve opening, of course, is accurately readable by observing the position of the mark $a$, which most nearly registers with the mark $b$ designated by the letter A, and by observing at the same time the position of the edge of the tapering barrel-portion 20 relative to the respective mark $c$. Thus, if the valve stem has been turned, for instance, so that the edge of the barrel or element 18 is in a position near to the mark $c$ designated by the numeral 1, as suggested by the dot-and-dash line in Figure 2, and if it is assumed that the mark $a$ designated by the numeral 5 is in a registering position with the mark $b$ designated by the letter A, thirty-hundredths of the full valve opening is thereby indicated. In this manner, when the number of threads per inch in the threaded portion 8 of the stem 9 is known, and when the degree of fluid pressure is also known, the quantity of fluid flowing within a specified time through the valve is easily ascertainable. By providing the threaded portion 8 with the correct number of threads per inch and by arranging the marks $a$ and $c$ accordingly, a reading of a thousandth of an inch and even less may be obtained, so that the flow of the minutest quantities through the valve, either of liquids or gases, can be instantly measured and that the valve thus is adapted for numerous uses, even including the use for such scientific purposes as demand the most nearly accurate reading that is humanly possible.

When the packing 11 has been worn so that it becomes necessary to retighten the gland 10 upon the valve-stem guide 7, such retightening may cause another mark $b$ to be most available for observation, as shown in Figure 4, which suggests that the gland 10 has been turned in the direction of the arrow in Figure 3 until the mark $b$ designated by the letter B is directly in front of the observer, while the marks designated by the letters A and C are respectively at the left and the right and therefore not so easily observable. After the retightening of the gland, the element 18 is set with reference to the mark $b$ designated by the letter B in the same manner as explained with reference to the mark $b$ designated by the letter A. From the foregoing it is obvious that the gland may be repacked and that any of the marks $b$ respectively designated by the letters A, B, C, D, E or F may be most available for observation after the tightening of the gland on the valve-stem guide 7, and also that the element 18 may be set and locked accordingly in a correct position upon the valve stem 9.

I wish it to be understood that, while my invention has been shown as applied to a valve having a gland 10 adapted to be screwed upon a valve-stem guide 7, it is adapted to be applied in numerous other ways and to valves of a type different from that shown. The principle of my invention may be applied, for example, to valves in which the follower for holding the packing around the valve stem in a stuffing box is adjustably secured to the valve body by nuts and bolts, but, since such an application and similar applications of my invention are clear from the foregoing disclosure of one embodiment of the invention, an illustration and a description thereof appear to be unnecessary.

It is also evident from the disclosure of my invention that, as long as a valve, constructed according to the principle thereof, is installed in such a position that the marks $a$ are readable, it may be turned to almost any position and may still be easily readable by an observer without causing him to strain himself in order to obtain the reading. The valve of my invention thus has a distinct advantage over other forms of graduated valves hitherto known in the art, which valves, when it is necessary to install them in an awkward position, either can not be read or can be read only with the utmost difficulty and by causing an observer to strain himself, thus making him liable to serious physical injuries.

I claim as my invention:

1. In a valve provided with a stem having a valve member thereon and being in a screw-threaded relation to the valve body, a gland having virtually concentrically thereon a tubular member and being adjustably connected with the valve body, the tubular member being longitudinally provided with an indicating mark and annularly provided with indicating marks equidistantly spaced from one another in correspondence with the threads on the valve stem; and a tubular element adjustably attached to the stem so as to be adapted to rotate freely around the gland member, the tubular element having spaced indicating marks concentrically thereon, so that, by the relation of the respective marks on the element to the longitudinal mark and the annular marks on the gland member, the closed position of the valve member, or the degree of valve opening, may be accurately indicated.

2. In a valve provided with a stem having a valve member thereon and being in a screw-threaded relation to the valve body, a gland having virtually concentrically thereon a tubular member and being adjustably connected with the valve body, the tubular member being longitudinally provided with a plurality of indicating marks and annularly provided with indicating marks equidistantly spaced from one another in correspondence with the threads on the valve stem; and a tubular element adjustably attached to the stem so as to be adapted to rotate freely around the gland member, the tubular element having spaced indicating marks circumferentially thereon, so that, by the relation of the respective marks on the element to a respective longitudinal mark and the annular marks on the gland member, the closed position of the valve member, or the degree of valve opening, may be accurately indicated.

3. In a valve provided with a stem having a valve member thereon and being in a screw-threaded relation to the valve body, a gland having virtually concentrically thereon a tubular member and being adjustably connected with the valve body, the tubular member being longitudinally provided with a plurality of indicating marks, extending over the juncture portion of the member with the gland and over the sides of the latter, and also being annularly provided with indicating marks equidistantly spaced from one another in correspondence with the threads on the valve stem; and a tubular element adjustably attached to the stem so as to be adapted to rotate freely around the gland member, the tubular element having spaced indicating marks circumferentially thereon, so that, by the relation of the respective longitudinal mark and the annular marks on the gland member, the closed position of the valve member, or the degree of valve opening, may be accurately indicated.

In testimony whereof I affix my signature.

LUIGI LANZA.